United States Patent
Huang et al.

(10) Patent No.: US 10,567,048 B2
(45) Date of Patent: Feb. 18, 2020

(54) TECHNIQUES FOR DETERMINING UPLINK PRECODING MATRIX FOR A USER EQUIPMENT

(71) Applicant: QUALCOMM Incorporated, San Diego, CA (US)

(72) Inventors: Yi Huang, San Diego, CA (US); Wei Zeng, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,727

(22) Filed: Sep. 19, 2017

(65) Prior Publication Data

US 2018/0091197 A1    Mar. 29, 2018

Related U.S. Application Data

(60) Provisional application No. 62/399,333, filed on Sep. 23, 2016.

(51) Int. Cl.
*H04B 7/0456*    (2017.01)
*H04L 25/02*    (2006.01)

(52) U.S. Cl.
CPC ....... *H04B 7/0456* (2013.01); *H04L 25/0224* (2013.01)

(58) Field of Classification Search
CPC ...... H04B 7/0456; H04B 7/04; H04L 25/0224
See application file for complete search history.

(56) References Cited

U.S. PATENT DOCUMENTS

| 2015/0195020 | A1* | 7/2015 | Zhu | H04B 7/0617 370/329 |
| 2016/0134340 | A1* | 5/2016 | Pan | H04B 7/0417 370/328 |
| 2017/0111082 | A1* | 4/2017 | Zhu | H04B 1/00 |

FOREIGN PATENT DOCUMENTS

| EP | 2738950 A2 | 6/2014 |
| EP | 2894801 A1 | 7/2015 |
| WO | 2016131487 A1 | 8/2016 |

OTHER PUBLICATIONS

Partial International Search Report—PCT/US2017/052423—ISA/EPO—dated Nov. 28, 2017.
International Search Report and Written Opinion—PCT/US2017/052423—ISA/EPO—dated Jan. 22, 2018.

* cited by examiner

*Primary Examiner* — Christopher M Brandt
(74) *Attorney, Agent, or Firm* — Patterson & Sheridan LLP

(57) ABSTRACT

Certain aspects of the present disclosure provide techniques for determining precodings of signals transmitted in a wireless communications system. According to certain aspects, a method of wireless communication by a user equipment (UE) is provided. The method generally includes receiving a precoded reference signal (RS) from a base station (BS), determining a first precoding used by the BS to transmit the RS, and determining, based on the first precoding, a second precoding for use by the UE to transmit a signal to the BS.

19 Claims, 13 Drawing Sheets

TECHNIQUES FOR DETERMINING UPLINK PRECODING MATRIX FOR A USER EQUIPMENT

CROSS-REFERENCE TO RELATED APPLICATIONS

The present Application for Patent claims priority to U.S. Provisional Application No. 62/399,333, filed Sep. 23, 2016, which is assigned to the assignee of the present application and hereby expressly incorporated by reference herein in its entirety.

INTRODUCTION

Aspects of the present disclosure generally relate to wireless communication systems, and more particularly, to determining a precoding matrix for a user equipment to use in transmitting an uplink signal in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as to support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect of the present disclosure, a method for wireless communications is provided. The method may be performed, for example, by a user equipment (UE). The method generally includes receiving a precoded reference signal (RS) from a base station (BS), determining a first precoding used by the BS to transmit the RS, and determining, based on the first precoding, a second precoding for use by the UE to transmit a signal to the BS.

In an aspect of the present disclosure, a method for wireless communications is provided. The method may be performed, for example, by a base station (BS). The method generally includes selecting a first precoding to convey using a reference signal (RS), to a user equipment (UE), from which the UE determines a second precoding for use by the UE to transmit an uplink (UL) signal to the BS and transmitting a reference signal (RS) to the UE using the first precoding.

In an aspect of the present disclosure, a method for wireless communications using an open loop technique to determine a precoding for a user equipment (UE) is provided. The method generally includes receiving an unprecoded reference signal (RS) from a base station (BS), estimating a channel from the BS to the UE based on the received unprecoded reference signal, performing matrix decomposition of the estimated channel to determine a precoding for use by the UE to transmit a signal to the BS, and transmitting an UL signal using the precoding.

In an aspect of the present disclosure, an apparatus for wireless communications is provided. The apparatus generally includes means for receiving a precoded reference signal (RS) from a base station (BS), means for determining a first precoding used by the BS to transmit the RS, and means for determining, based on the first precoding, a second precoding for use by the apparatus to transmit a signal to the BS.

In an aspect of the present disclosure, an apparatus for wireless communications is provided. The apparatus generally includes means for selecting a first precoding to convey using a reference signal (RS), to a user equipment (UE), from which the UE determines a second precoding for use by the UE to transmit an uplink (UL) signal to the apparatus and means for transmitting a reference signal (RS) to the UE using the first precoding.

In an aspect of the present disclosure, an apparatus for wireless communications using an open loop technique to determine a precoding is provided. The apparatus generally includes means for receiving an unprecoded reference signal (RS) from a base station (BS), means for estimating a channel from the BS to the apparatus based on the received unprecoded reference signal, means for performing matrix decomposition to determine a precoding for use by the apparatus to transmit a signal to the BS, and means for transmitting an UL signal using the precoding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
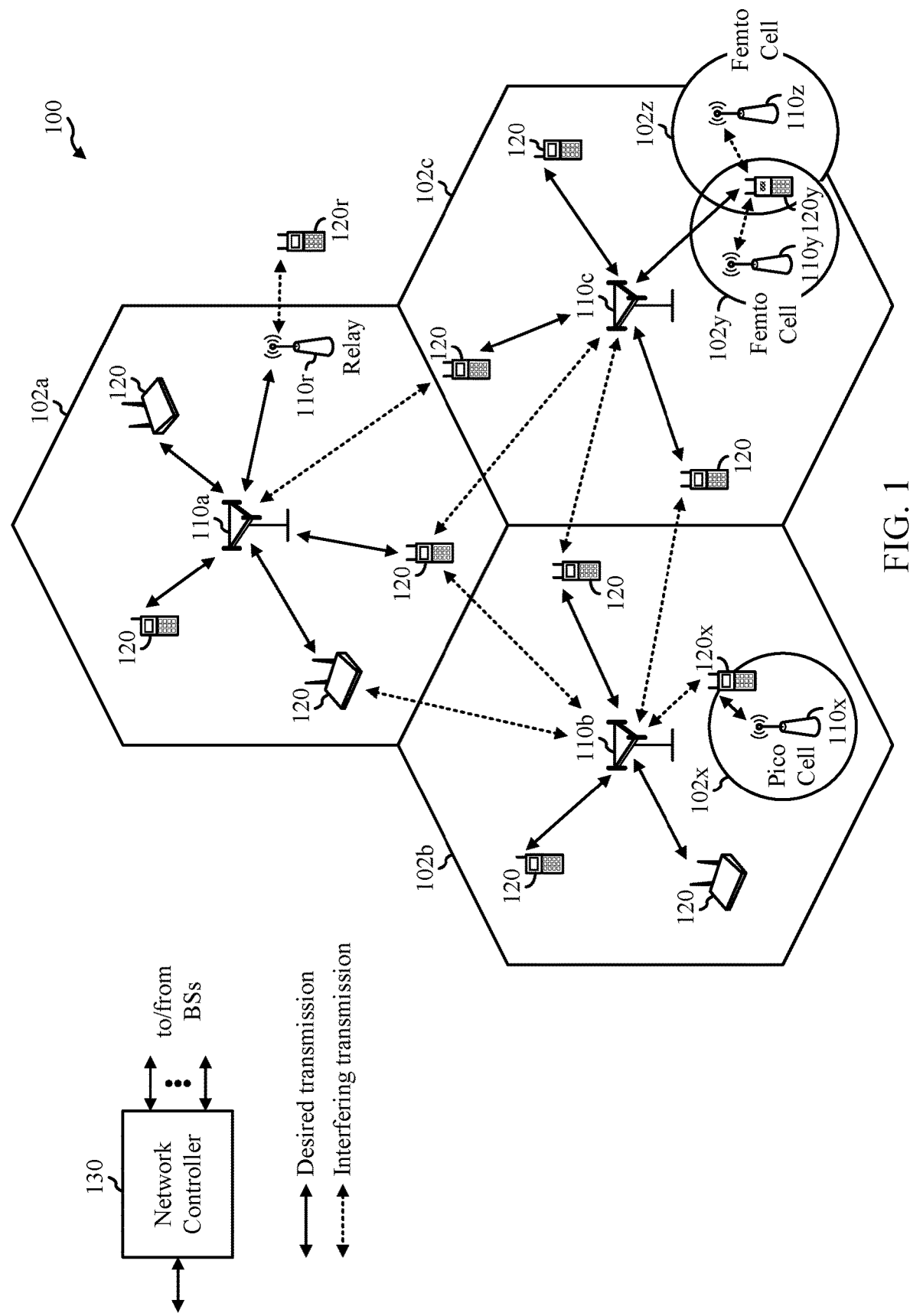
FIG. 1 is a block diagram conceptually illustrating an example telecommunications system, according to aspects of the present disclosure.

Aspects of the present disclosure provide apparatus, methods, processing systems, and computer program products for determining a precoding matrix for a user equipment to use in transmitting an uplink signal in a wireless communications system, such as a new radio (NR) system. New radio may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include enhanced mobile broadband (eMBB) targeting wide bandwidth (e.g., 80 MHz and beyond), millimeter wave (mmW) targeting high carrier frequency (e.g., 60 GHz), massive machine type communications (mMTC) targeting non-backward compatible machine type communication (MTC) techniques, and mission critical targeting ultra reliable low latency communications (URLLC). For these general topics, different techniques are considered, such as coding, low-density parity check (LDPC), and polar. "NR cell" may refer to a cell operating according to the new air interface or fixed transport layer. A NR NodeB (e.g., a 5G NodeB) may correspond to one or more transmission and reception points (TRPs). A 5G NodeB may also be referred to as an access node (AN), and may comprise an access node controller (ANC) and one or more TRPs.

A UE may exchange (e.g., transmit and/or receive) packets with a BS. According to previously known techniques, a BS determines a precoding matrix for a UE to use when transmitting to the BS. The BS transmits an index, selected from a codebook of precoding matrices, to the UE to indicate to the UE the determined precoding matrix. According to aspects of the present disclosure, a UE may determine a precoding matrix to use in transmitting to a BS based on a precoding used by the BS in transmitting a reference signal to the UE and/or based on channel conditions between the UE and the BS Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 800 discussed in more detail below for wirelessly communicating enciphered messages with a cell. BS 110 may comprise a transmission and reception point (TRP) configured to perform the operations 900 discussed in more detail below for wirelessly communicating enciphered messages to the UE 120. The NR network may include a central unit that may be configured, with the UEs 120 and the BS 110, to perform operations related to measurement configuration, measurement reference signal transmission, monitoring, detection, measurement, and measurement reporting.

The system illustrated in FIG. 1 may be, for example, a long term evolution (LTE) network. The wireless network 100 may include a number of BSs (e.g., NodeBs, evolved NodeBs (eNB), 5G NodeBs, access nodes, TRPs, etc.) 110 and other network entities. A BS may be a station that communicates with the UEs and may also be referred to as a NodeB, an enhanced NodeB (eNodeB), a gateway-station NodeB (gNB), an access point, etc. A NodeB and 5G NodeB (e.g., a transmission and reception point, an access node) are other examples of stations that communicate with the UEs.

Each BS 110 may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscriptions. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro NodeB. A BS for a pico cell may be referred to as a pico NodeB. A BS for a femto cell may be referred to as a femto NodeB or a home NodeB. In the example shown in FIG. 1, the BSs 110a, 110b and 110c may be macro NodeBs for the macro cells 102a, 102b and 102c, respectively. The BS 110x may be a pico NodeB for a pico cell 102x. The BSs 110y and 110z may be femto NodeBs for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay NodeB, a relay, etc.

The wireless network 100 may be a heterogeneous network that includes BSs of different types, e.g., macro NodeBs, pico NodeBs, femto NodeBs, relays, transmission and reception points (TRPs), etc. These different types of BSs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, access nodes, TRPs, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
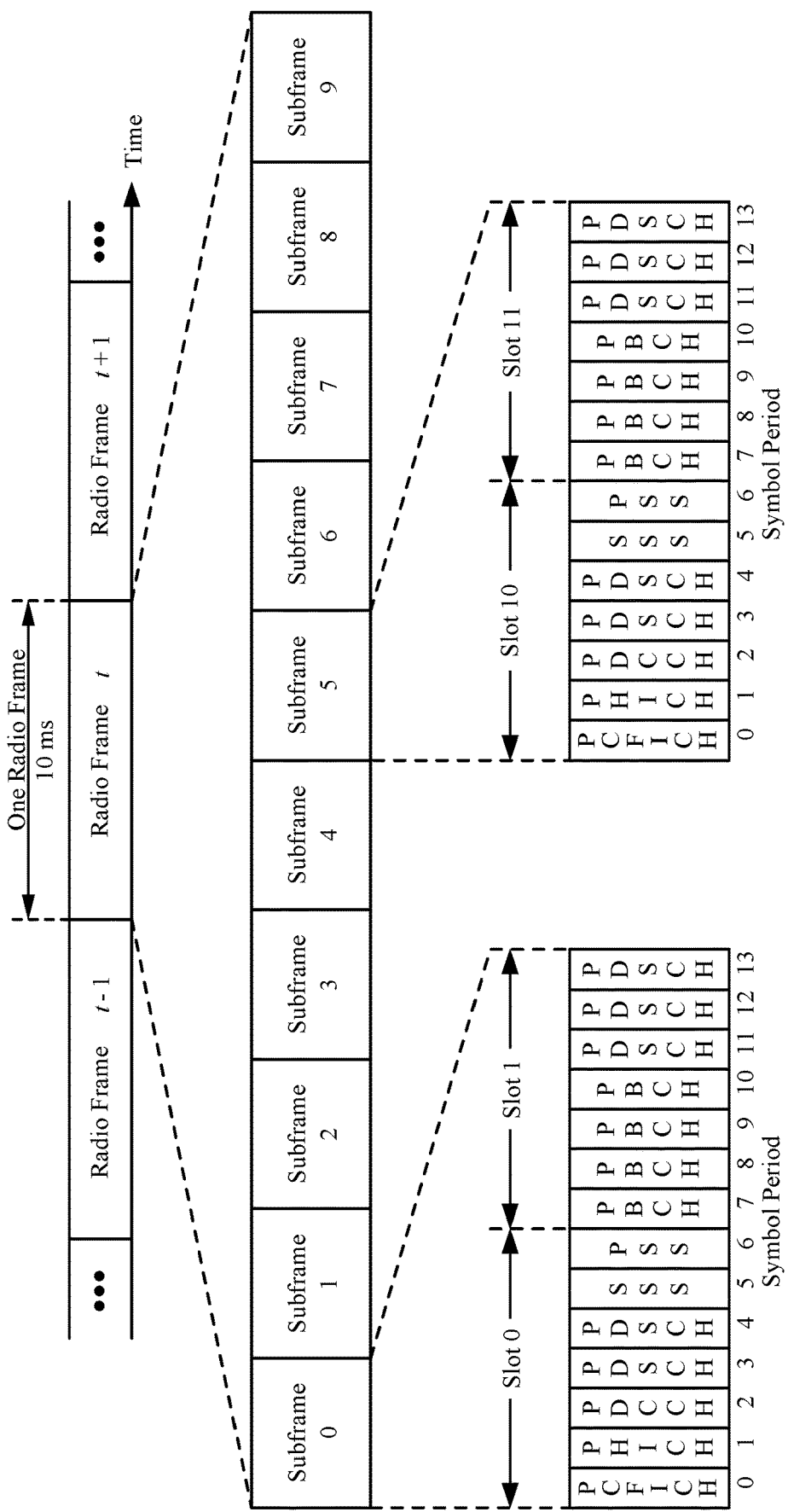
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell in the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
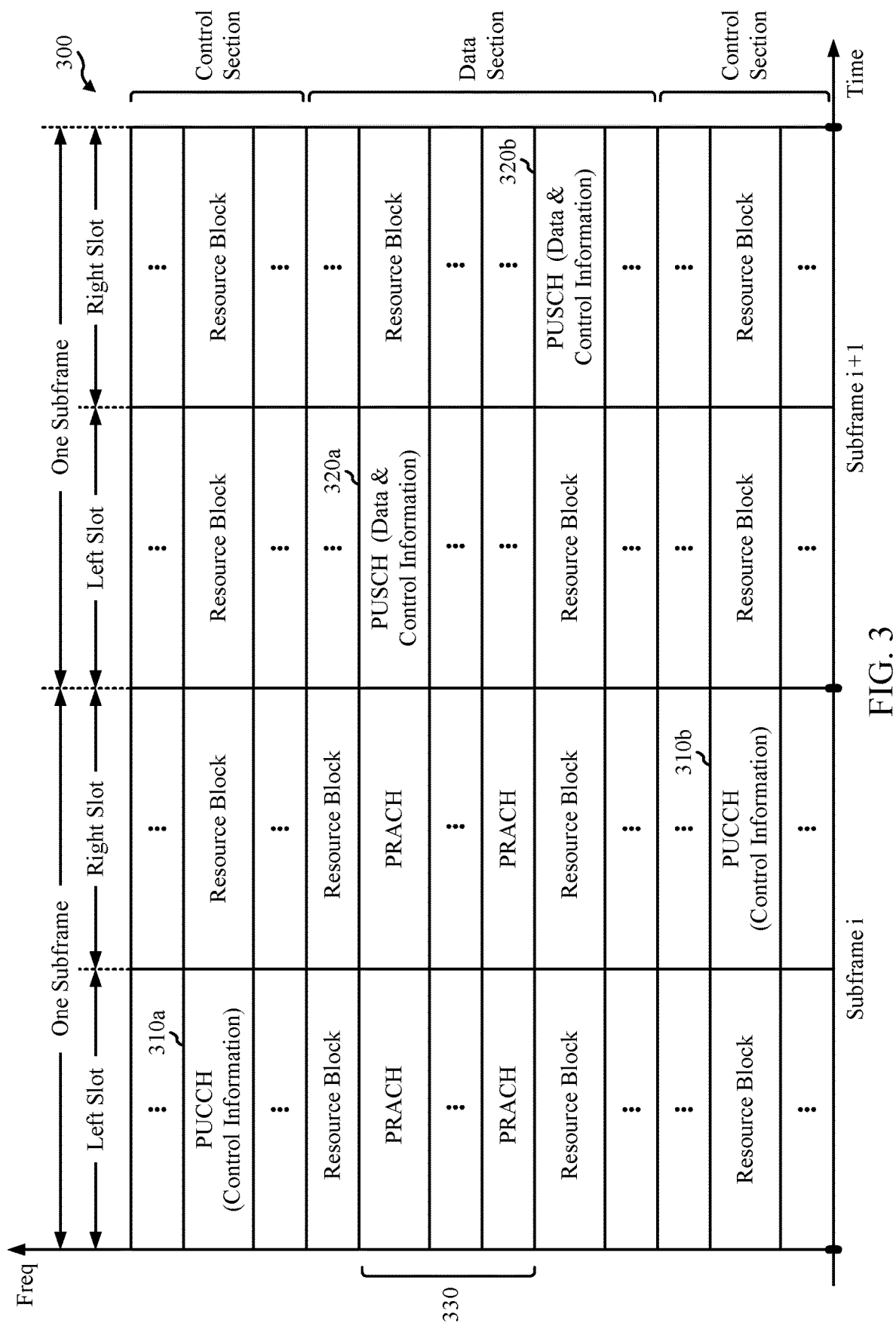
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a NodeB. The UE may also be assigned resource blocks 320a, 320b in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
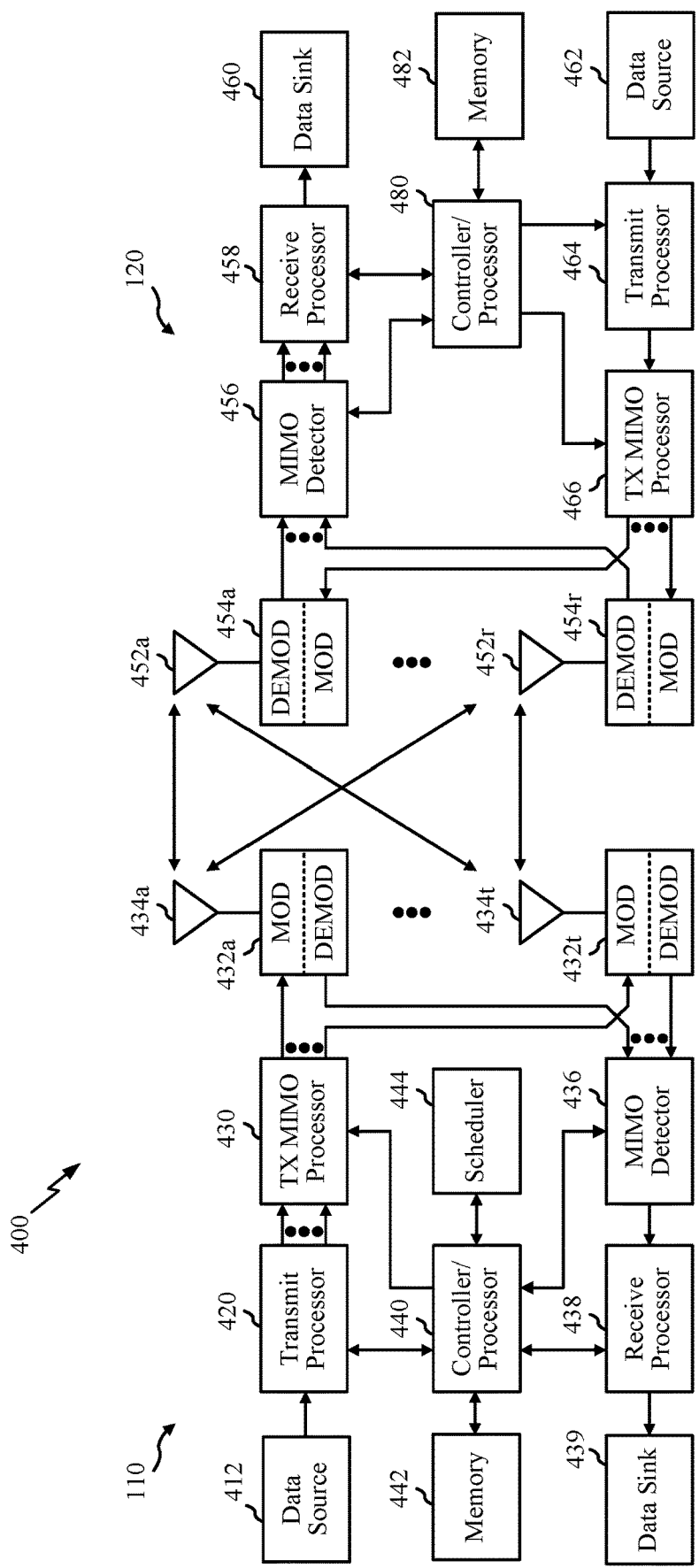
FIG. 4 is a block diagram conceptually illustrating a design of an example base station (BS) and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9 and 12. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 8 and 12, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
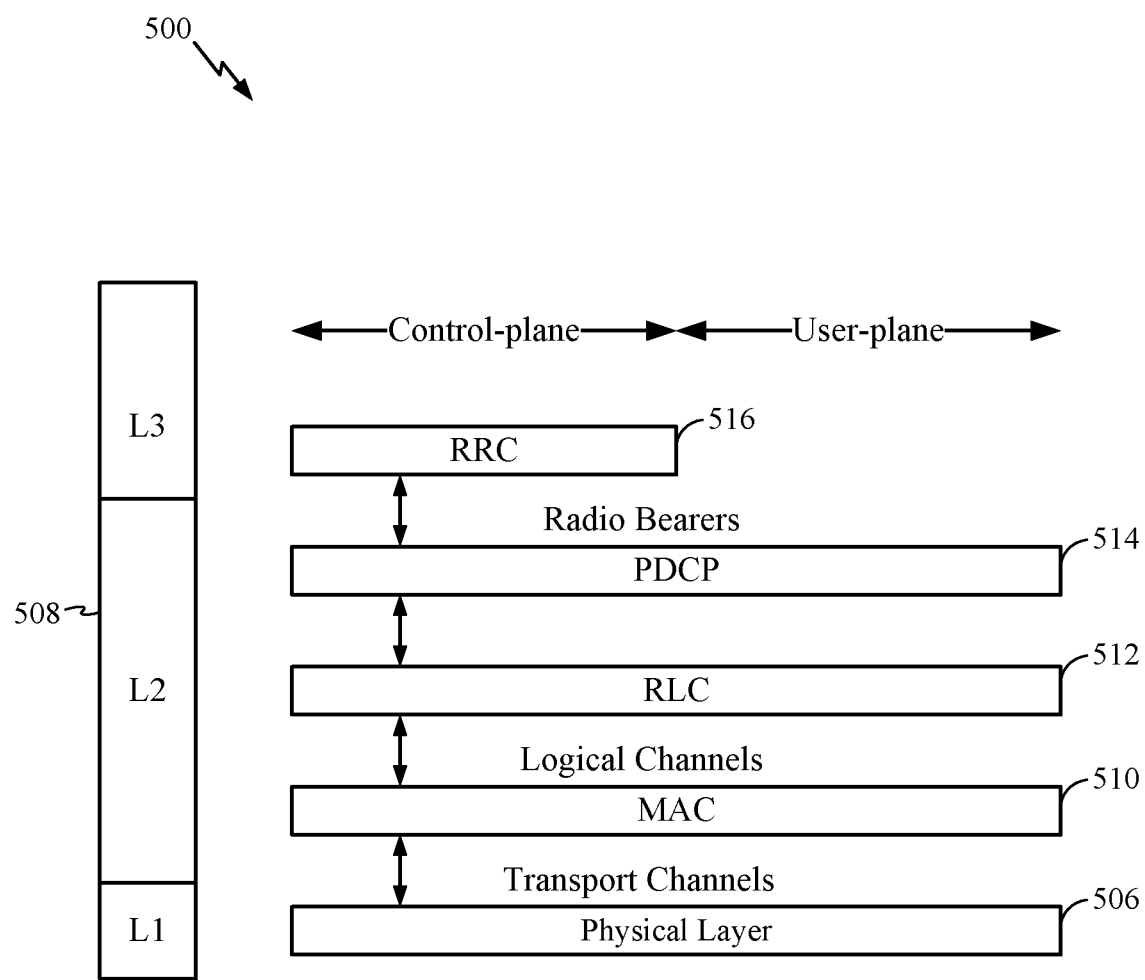
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE.

The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

A UE may be in one of a plurality of operating states. One of the states may be referred to as an RRC_IDLE state. In the RRC_IDLE state, the UE may not have an active connection to an AN, and the AN does not have a context for the UE.

Another of the operating states may be an inactive state. In the inactive state, there is a UE context in the AN, but no active connection between the UE and the AN. The inactive state may be referred to as "RRC_COMMON," "RRC_INACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a long discontinuous reception (DRX) cycle (e.g., around 320 ms to 2560 ms). The UE can receive multimedia broadcast multicast service (MBMS) data while in this state. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to an AN) or a data transmission procedure that may include contention based access (e.g., performing a contention procedure to access a BS).

Another of the operating states may be an active state. In the active state, there is a UE context in the AN and an active connection between the UE and the AN. In the active state, the UE may have dedicated resources for transmissions to or from the AN and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the AN obtains information that the AN should set up an RRC connection with dedicated resources for the UE (e.g., the AN receives an RRC connection resume request message from the UE, the AN obtains data to be transmitted to the UE), then the AN may send a transmission (e.g., a page) to the UE to cause the UE to transition to the active state. When the AN acknowledges the RRC connection resume request message, then the UE may enter the active state.

Figure 6:
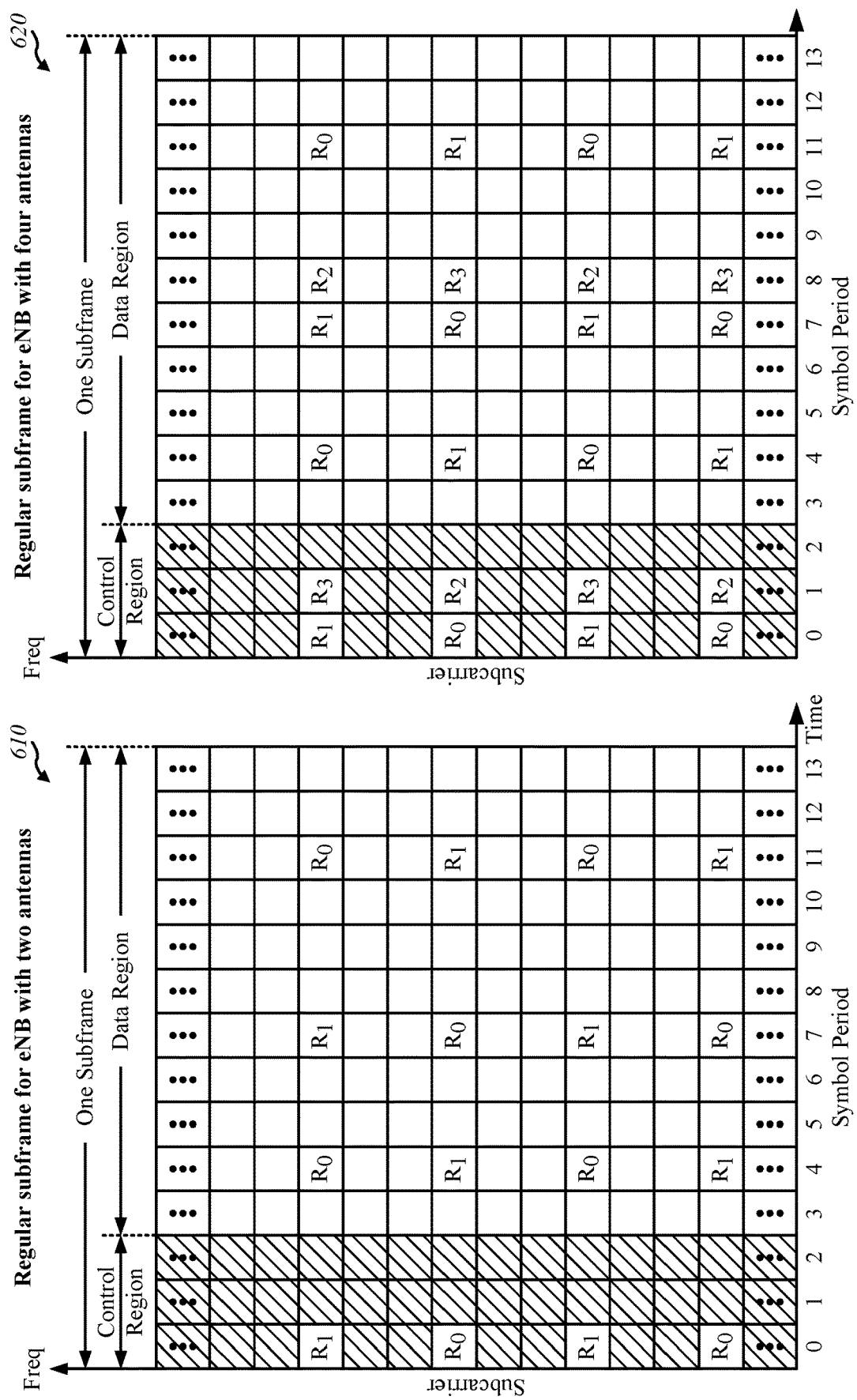
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

New radio (NR) may refer to radios configured to operate according a wireless standard, such as 5G (e.g. wireless network 100). NR may include enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR BS (e.g., BS 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources may be indicated in system information (SI) transmitted on the downlink resources. For example, system information can be transmitted in a physical broadcast channel (PBCH) carrying a master information block (MIB).

NR RAN architecture may include a central unit (CU). The CU may be an access node controller (ANC). The CU may terminate a backhaul interface to a radio access network core network (RAN-CN) and/or terminate a backhaul interface to a neighbor RAN node. The RAN may include a distributed unit (DU) that may be one or more TRPs that may be connected to one or more ANCs. TRPs may advertise System Information (e.g., Global TRP ID), may include PDCP/RLC/MAC functions, may comprise one or more antenna ports, may be configured to individually (dynamic selection) or jointly (joint transmission) transmit signals, and may serve traffic to the UE.

Wireless standards, such as 5G, may include latency and reliability requirements. Latency in a network may refer to the amount of time required for a packet of data to get from one point in the network to another point in the network. For example, latency in the user plane may be defined based on the time required for a successful delivery of an application layer packet from a layer 2 or 3 medium access control (MAC) service data unit (SDU) ingress point to a layer 2 or 3 MAC SDU egress point through a radio interface. Average latency for URLLC may target 0.5 ms for UL and 0.5 ms for DL in the user plane for certain standards. Average latency for eMBB may target 4 ms for UL and DL and for mMTC, latency may be no worse than 10 seconds on UL for a 20 byte application packet (105 bytes at the PHY layer with uncompressed IP headers) at 164 dB minimum coupling loss (MCL).

A wireless standard may include a reliability requirement separate from the latency requirement. Reliability in a network may refer to a probability of successfully transmitting X number of bytes within 1 ms, where 1 ms is the time to deliver a small packet from a protocol layer 2 or 3 SDU ingress point to an egress point, at a certain channel quality. For example, reliability for URLLC may be $1 \times 10^{-5}$ within 1 ms for X number of bytes (e.g., 20 bytes), with a user latency of 1 ms. As another example, enhanced vehicle-to-X (eV2X) may require reliability of $1 \times 10^{-5}$ for 300 bytes within 1 ms. Additionally user plane latency of 3-10 ms for direct communications via a sidelink and communication range of, for example, a few meters, along with user plane latency of 2 ms when a packet is relayed via a BS may be required.

To achieve $1 \times 10^{-5}$ reliability within 1 ms along with the target 0.5 ms latency for URLLC services, interference from other URLLC users as well as other services, such as eMBB users, should be minimized. For DL, given the target latency requirement, a URLLC transmission may need to puncture another lower priority transmission. As DL is controlled by a NodeB, the NodeB can schedule the URLLC transmission over and puncture lower priority transmission, such as one by an eMBB user and rely on outer code or other mechanisms to minimize impact to eMBB users. For UL, all UL assignments are scheduled well in advance and cannot be punctured on the fly. For example, a lower priority transmission, such as eMBB, may be transmitting from a first UE. If a second UE attempts to transmit a URLLC transmission during time the first UE is transmitting, the two transmissions may collide and result in interference. Accordingly, techniques allowing for co-existence of reliable low-latency services with other services in a wireless network are desirable.

Figure 7:
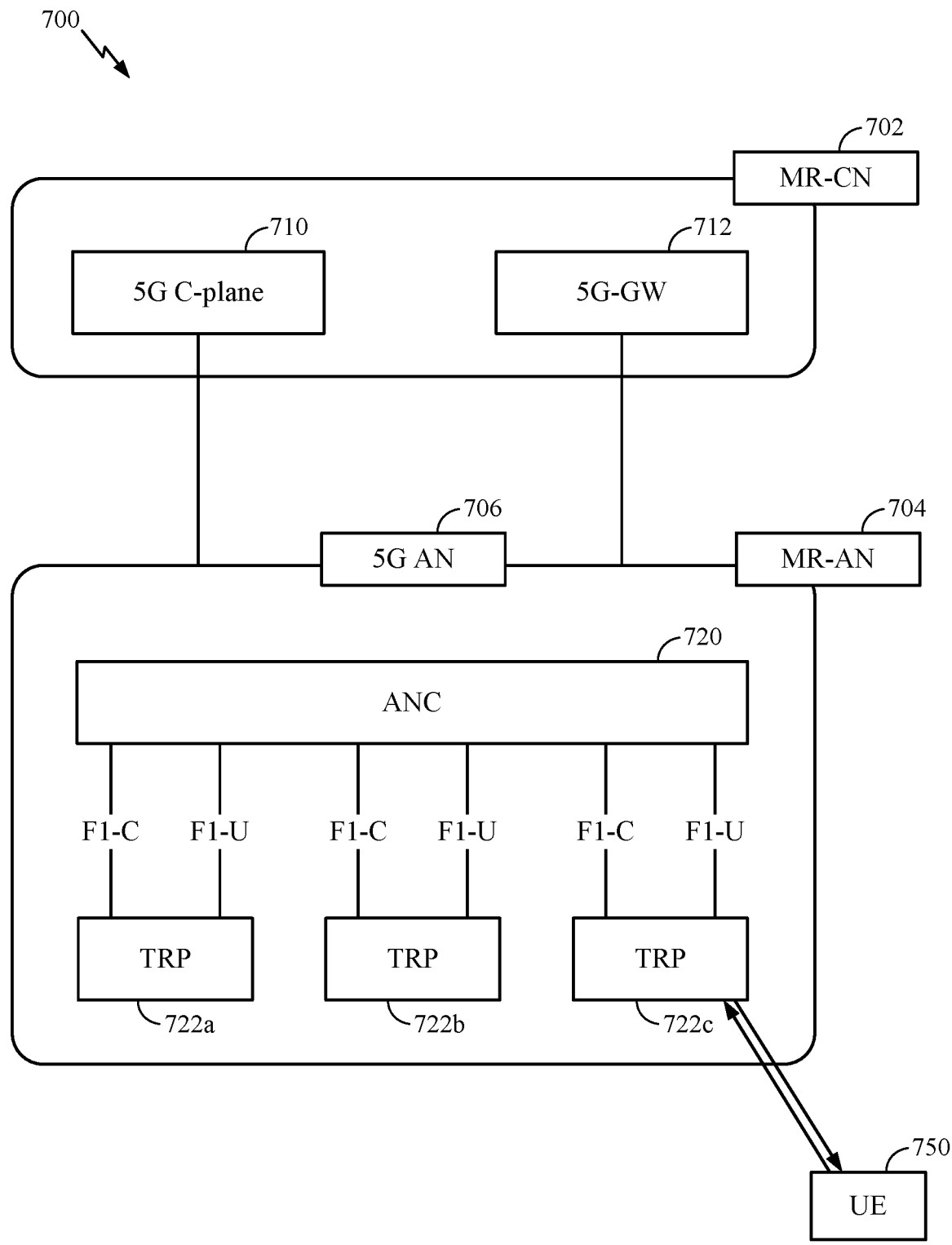
FIG. 7 illustrates an exemplary logical architecture of a 5G radio access network, according to previously known techniques.

FIG. 7 illustrates an exemplary logical architecture 700 of a 5G radio access network. The exemplary architecture includes a multi-RAT core network (MR-CN) 702 and a multi-RAT access network (MR-AN) 704. While the MR-CN is shown with a single MR-AN, the disclosure is not so limited and an MR-CN may include more MR-ANs, as well as single-RAT access networks. The MR-CN includes a 5G control plane (C-plane) function 710 and a 5G gateway (GW) 712. The 5G control plane may manage connections of the various UEs and other entities connecting to the RAN. The 5G gateway may enable and manage connections to other networks (e.g., the Internet). The MR-AN includes a 5G access network (AN) 706 that includes an access node controller (ANC) 720 that is connected with a plurality of TRPs 722. While the MR-AN is shown with a single 5G AN, the disclosure is not so limited and an MR-AN may include multiple 5G ANs, as well as ANs of other technologies. Control messages to and from the 5G AN may travel from and to the C-plane function, while data to and from the 5G AN may travel to and from the 5G-GW. The ANC terminates a backhaul interface to the MR-CN via an NG1 control (NG1-C) interface and/or an NG1 user (NG1-U) interface. The ANC also terminates a backhaul interface to neighbor MR-ANs, via an XN2 user (XN2-U) interface and/or an XN2 control (XN2-C) interface.

Transmission and reception points (TRPs) may be distributed over a geographical area, and each TRP may serve one or more cells. While not shown in FIG. 7, a TRP may be connected to one or more ANCs (e.g. for RAN sharing, radio resources as a service (RaaS), and service specific ANC deployments). Also, an ANC may be connected with only a single TRP in some cases. A TRP may advertise system information (e.g., a global TRP ID) and may include PDCP, RLC, and/or MAC functions. A TRP may comprise one or more antenna ports. A TRP may be configured to individually (dynamic selection) or jointly (joint transmission) serve traffic to a UE 750. As illustrated, an ANC may communicate with a TRP via an F1 control interface (F1-C) and an F1 user interface (F1-U).

Example Determining Uplink Precoding Matrix

As mentioned above and described in more detail below, aspects of the present disclosure provide techniques for determining a precoding matrix for a UE to use in transmitting an uplink signal in a wireless communications system, such as a new radio (NR) (e.g., 5G) system.

A UE may exchange (e.g., transmit and/or receive) packets with a BS. According to previously known techniques, a UE may receive an uplink grant for a set of time and frequency resources and a precoding matrix indicator (PMI) from the BS. In response to receiving the grant, the UE may transmit an uplink signal on the indicated time and frequency resources using a precoding matrix indicated by the PMI. The BS may refer to a codebook of precoding matrices when selecting the PMI to send to the UE, and the UE may refer to a similar codebook of precoding matrices to determine which precoding matrix is indicated by the PMI.

According to aspects of the present disclosure, a BS may convey to a UE information regarding uplink precoding for the UE to use, when transmitting to the BS, by embedding the information regarding the uplink precoding in a downlink reference signal to the UE. The BS may embed the information in the DL reference signal by using a particular precoding when transmitting the DL reference signal. The UE may measure the precoded downlink reference signal and determine the information regarding the uplink precoding.

According to aspects of the present disclosure, a UE may determine an uplink precoding for the UE to use, when transmitting to a BS, based on an unprecoded reference signal received by the UE and transmitted by the BS.

Figure 8:
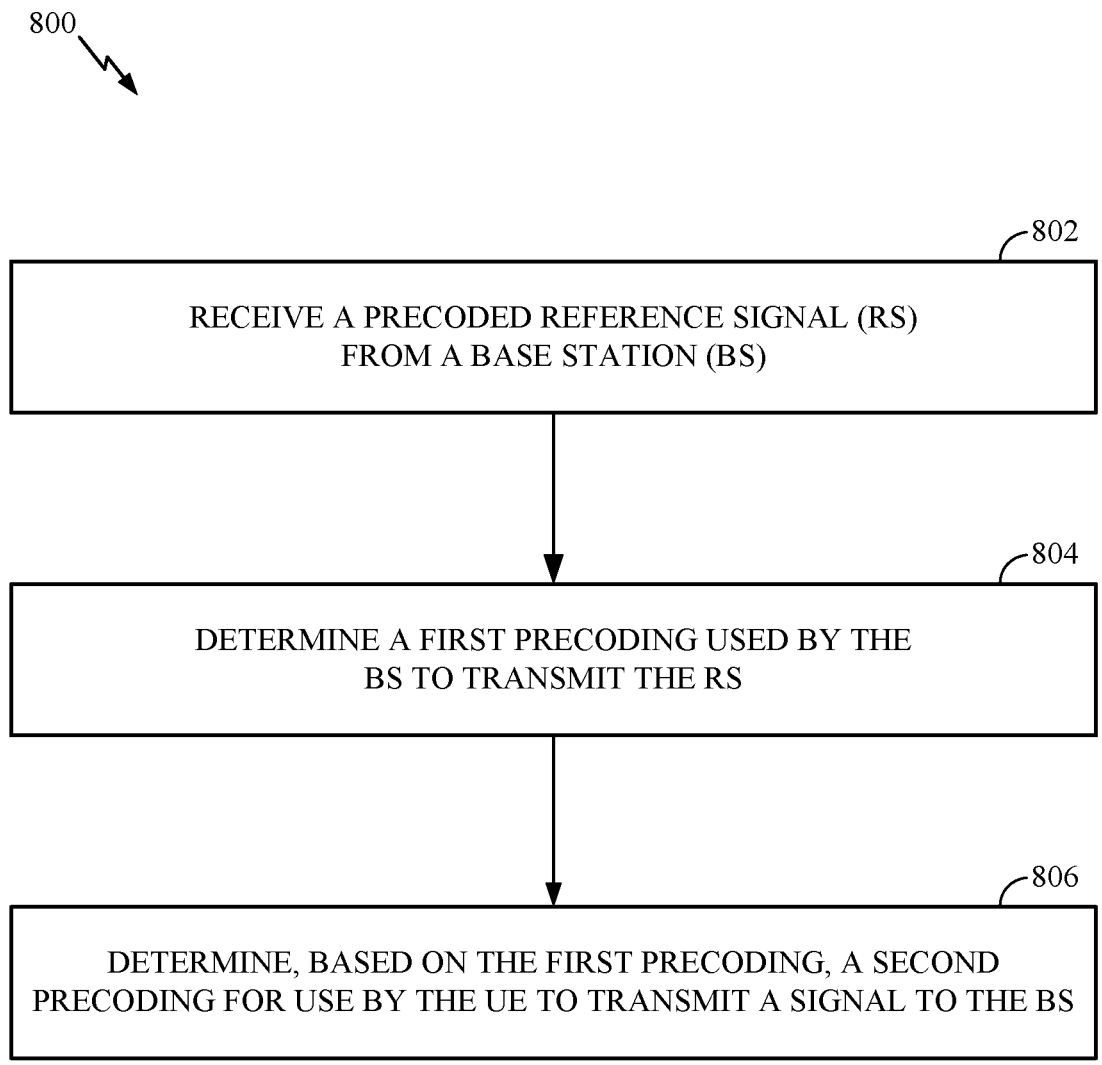
FIG. 8 illustrates example operations for wireless communications by a user equipment (UE), according to aspects of the present disclosure.

FIG. 8 illustrates example operations 800 for wireless communications by a user equipment (UE), according to aspects of the present disclosure. The operations 800 may be performed, for example, by UE 120, shown in FIG. 1, or UE 750, shown in FIG. 7.

Operations 800 may begin at 802 by the UE receiving a precoded reference signal (RS) from a base station (BS). For example, UE 750 may receive a precoded RS, which may be a precoded CSI-RS, from the TRP 722c.

At 804, the UE determines a first precoding used by the BS to transmit the RS. The UE may determine the first precoding using techniques described below. Continuing the example from above, the UE determines a first precoding that the TRP 722c used in precoding the precoded RS that the UE received in block 802.

At 806, the UE determines, based on the first precoding, a second precoding for use by the UE to transmit a signal to the BS. Continuing the example from above, the UE determines, based on the first precoding determined in block 804, a second precoding for use by the UE to transmit a signal to the BS.

Figure 9:
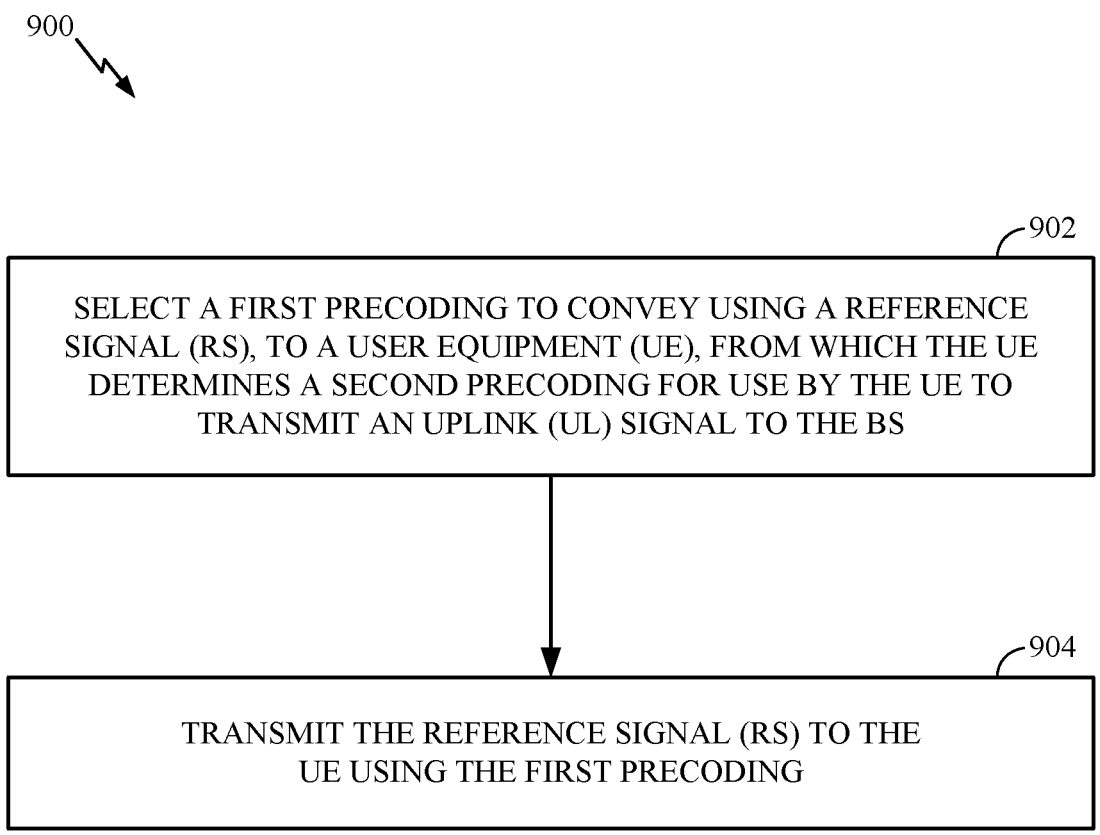
FIG. 9 illustrates example operations 900 for wireless communications by a base station (BS), according to aspects of the present disclosure.

FIG. 9 illustrates example operations 900 for wireless communications by a wireless node, according to aspects of the present disclosure. The operations 900 may be performed by a TRP, for example TRP 722c (shown in FIG. 7), an access node, for example multi-RAT access node 704 (shown in FIG. 7), or a base station, for example BS 110 (shown in FIG. 1), and may be considered complementary to the operations 800 shown in FIG. 8.

Operations 900 begin at 902 by the BS selecting a first precoding to convey using a reference signal (RS), to a user equipment (UE), from which the UE determines a second precoding for use by the UE to transmit an uplink (UL) signal to the BS. For example, TRP 722c selects a first precoding to convey using a reference signal to the UE 750, from which the UE determines a second precoding for use by the UE to transmit an uplink signal to the BS.

At 904, the BS transmits the reference signal (RS) to the UE using the first precoding. Continuing the example from above, the TRP transmits a reference signal, which may be a CSI-RS, using the first precoding.

According to aspects of the present disclosure, a BS may signal (e.g., convey) an UL precoding matrix to a UE for the UE to use in transmitting a signal coded with the UL precoding matrix to the BS. Determining an UL precoding matrix to use based on a precoded DL reference signal may be referred to as a closed-loop technique. In a closed-loop technique, a BS signals an UL precoding matrix to a UE.

According to aspects of the present disclosure, using a closed loop method to determine an UL precoding matrix for a UE, a BS may convey an UL precoding to a UE via an appropriately precoded DL RS, such as a channel state information reference signal (CSI-RS). In one example, the UL precoding may be a precoding matrix. That is, the UL precoding conveyed by the signal from the BS explicitly indicates a precoding matrix, and a UE receiving the signal conveying the UL precoding may calculate (e.g., the UE determines the precoding used by the BS in transmitting the precoded DL RS and calculates a precoding matrix based on the precoding used by the BS) or otherwise determine a precoding matrix from the UL precoding. In another example, the UL precoding may be an index in a codebook. That is, the UL precoding conveyed by the signal from the BS indicates an entry in a precoding matrix codebook, and a UE receiving the signal conveying the UL precoding may determine a precoding matrix by looking up the UL precoding in the precoding matrix codebook.

Figure 10:
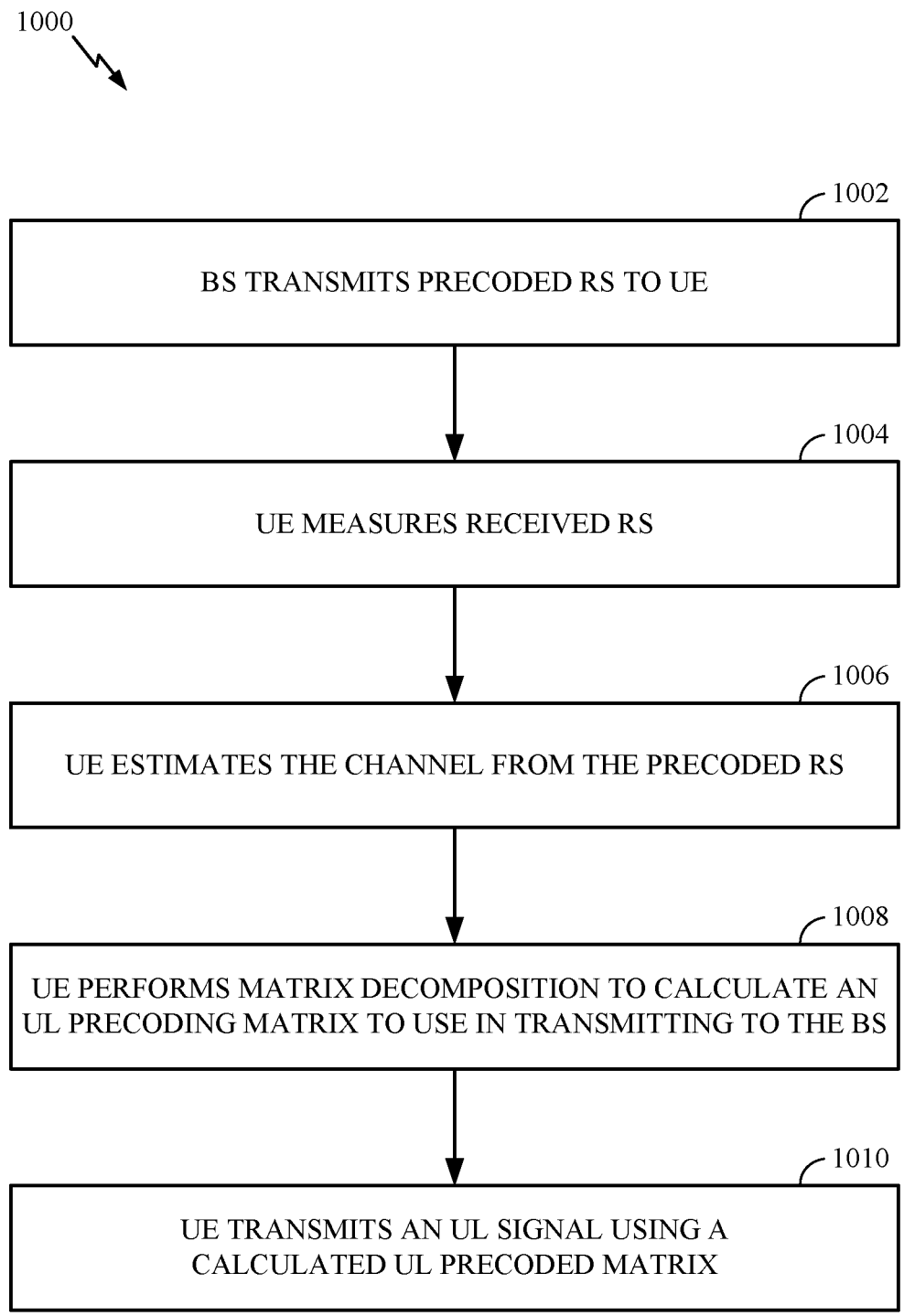
FIG. 10 illustrates example operations for wireless communications using closed loop signaling to signal an uplink precoding matrix to a UE, in accordance with aspects of the present disclosure.

According to previously known techniques, a BS may transmit a CSI-RS to a UE when the BS needs a channel state information report from the UE. See, for example, FIG. 10, block 1002. The UE measures the received CSI-RS (block 1004), estimates the channel from the precoded CSI-RS (block 1006), and reports information (e.g., strengths of interference and in which frequency(s) the interference occurs) about the channel state to the BS (not shown).

According to aspects of the present disclosure, a BS may use a precoding (e.g., a precoding matrix) while transmitting a CSI-RS or other reference signal in order to convey, to a UE, a precoding for the UE to use while transmitting to the BS. The UE may determine the precoding used by the BS in transmitting the reference signal, assume channel reciprocity (e.g., the same channel state that the UE observed in receiving the reference signal applies for a transmission by the UE) for transmissions to the BS (e.g., in a TDD system), and determine a precoding to use in transmitting to the BS as a function of the precoding used by the BS to transmit the downlink reference signal. In one example, the UE performs matrix decomposition to calculate the UL precoding matrix (e.g., see FIG. 10, block 1008). The UE transmits an uplink signal using the calculated UL precoding matrix (e.g., see FIG. 10, block 1010). Signaling a precoding for another device to use by using a precoding while transmitting a reference signal may be referred to as analog signaling of the precoding.

Figure 11:
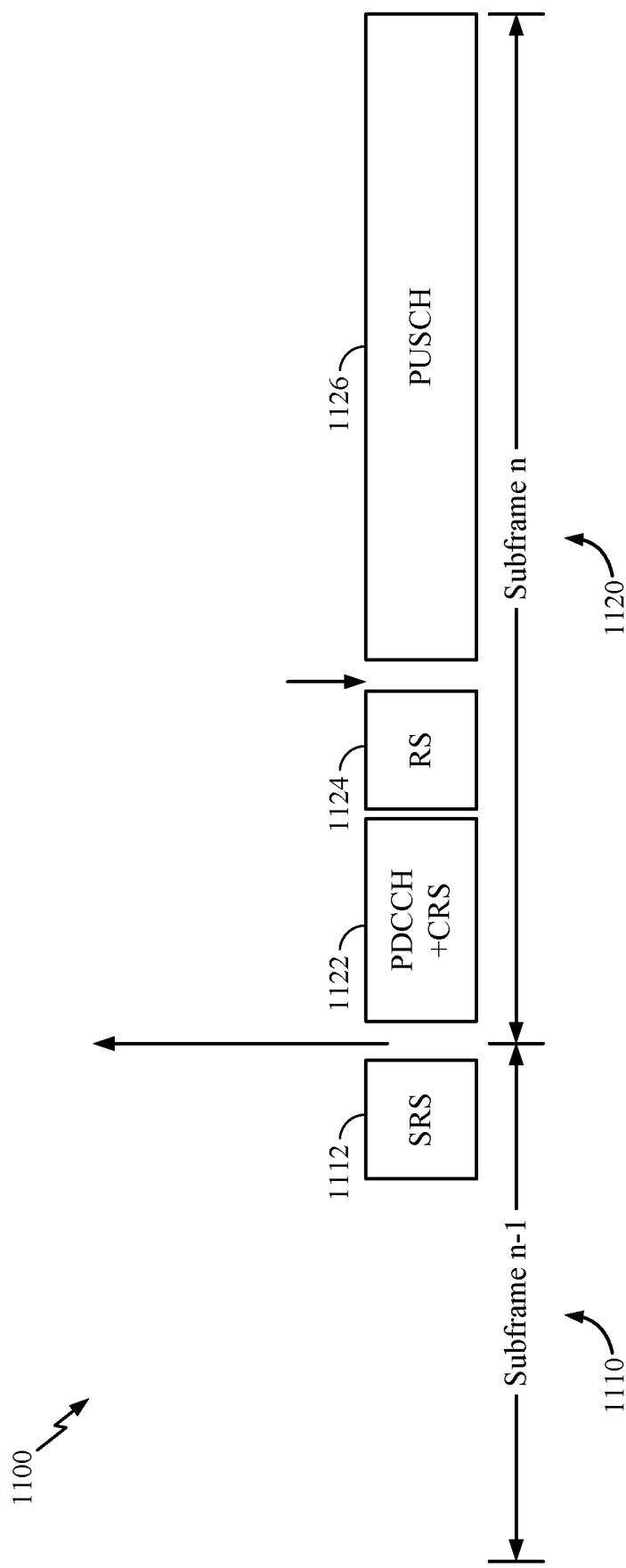
FIG. 11 illustrates an exemplary transmission timeline, according to aspects of the present disclosure.

FIG. 11 illustrates an exemplary transmission timeline 1100 of a communication system in which aspects of the present disclosure may be practiced. In the exemplary timeline, a BS (e.g., BS 110 shown in FIG. 1) and a UE (e.g., UE 120 shown in FIG. 1) are communicating while the BS uses analog signaling (as described above) to indicate a precoding for the UE to use while transmitting to the BS. At 1112, the UE transmits a sounding reference signal (SRS) in a subframe n−1 1110. The BS receives the SRS from the UE and estimates the channel, $H_{M \times N}$, between the UE and the BS. The BS then estimates a noise covariance matrix, $R_{nn,M \times M}$, based on the channel estimate. Next, the BS determines a downlink precoding matrix, $P_{M \times M}$, to use by calculating the inverse square-root of the noise covariance matrix, $R_{nn}^{-H/2}{}_{M \times M}$, and setting the downlink precoding matrix equal to the inverse square-root of the noise covariance matrix, i.e., $$P_{M \times M} = R_{nn}^{-H/2}{}_{M \times M}.$$

At 1122, the BS may transmit a PDCCH and cell-specific reference signals (CRS) in a subframe n 1120. The BS may use the calculated downlink precoding matrix when transmitting the PDCCH, which may include an uplink grant indicating that the UE is to transmit data to the BS. At 1124, the BS transmits a reference signal (e.g., a CSI-RS) using the calculated downlink precoding matrix $P_{M \times M}$.

The UE receives the precoded reference signal from the BS and estimates the channel, $H^H{}_{N \times M}$, based on the precoded RS. The UE also determines the downlink precoding matrix, $R_{nn}^{-H/2}{}_{M \times M}$, by, for example, measuring the content of the received reference signal and comparing the measurements to the known transmitted content (known because the content of the reference signal is known to the UE) of the reference signal. The UE then calculates the effective channel, $H'_{N \times M}$, by multiplying the estimated channel, $H^H{}_{N \times M}$, by the DL precoding matrix, $R_{nn}^{-H/2}{}_{M \times M}$, applied by the BS, i.e., $$H'_{N \times M} = (H^H)_{N \times M} R_{nn}^{-H/2}{}_{M \times M}.$$

The UE then applies channel reciprocity and assumes the effective channel for an uplink transmission is equal to the effective channel for the downlink transmission. For an uplink transmission, the effective channel is equal to an uplink precoding matrix, $V_{N \times N}$, multiplied by transmitted signal, i.e., $$H'_{N \times M} = V_{N \times N} \Sigma_{N \times M} U^H{}_{M \times M}.$$

The UE then performs matrix decomposition, such as singular value decomposition (SVD), to calculate the UL precoding matrix. At 1126, the UE transmits an uplink signal (e.g., a PUSCH) using the calculated UL precoding matrix.

While the preceding description showed a UE transmitting an uplink signal using a precoding signaled by a BS using analog signaling in a same subframe (e.g., subframe n) as a subframe in which the analog signaling was received, the disclosure is not so limited. According to aspects of the present disclosure, a BS may use analog signaling to signal a precoding for a UE to use, and the UE may use the signaled precoding in one or more transmissions in a subframe (e.g., subframe n+1) or subframes (e.g., n+1, n+2, . . . ) one or more subframes after the subframe (e.g., subframe n) in which the analog signaling of the precoding was received.

According to aspects of the present disclosure, a BS using closed loop analog signaling to indicate an uplink precoding matrix to a UE, as described above, does not feedback PMI (e.g., as with closed loop digital signaling), which may allow easier scaling to sub-band scheduling than a BS feeding back PMI to a UE.

According to aspects of the present disclosure, a wireless communication system that uses closed loop analog signaling to indicate an uplink precoding matrix to a UE, as described above, may have no quantization loss due to any limit on a size (e.g., in bits) of a PMI and a corresponding limit on a number of entries in a codebook, because a UE uses a directly calculated uplink precoding matrix. That is, a UE may use an uplink precoding matrix with a precision that is limited by the capability of the UE to calculate the uplink precoding matrix, rather than a compromise precoding matrix with a precision limited by a number of entries in a codebook of precoding matrices.

According to aspects of the present disclosure, a wireless communication system which uses closed loop analog signaling to indicate an uplink precoding matrix to a UE, as described above, may calculate more accurate channel estimates than other types of wireless communication systems. The channel estimates may be more accurate because CSI-RS, which are transmitted by BSs, can be much stronger than SRS, which are transmitted by UEs. The additional strength of CSI-RS can result in better estimation quality than may be achieved according to previous techniques in which the UE to BS channel is estimated by the BS based on SRS transmitted by the UE.

According to aspects of the present disclosure, a wireless communication system that uses closed loop analog signaling to indicate an uplink precoding matrix to a UE, as described above, may result in increased CSI-RS overhead, due to transmitting CSI-RS to signal uplink precoding matrices. In other types of wireless communication systems, CSI-RS are transmitted when the BS desires a CSI report from a UE.

According to aspects of the present disclosure, a BS may convey an UL precoding to a UE by directly signaling the precoding, such as by transmitting an index to an entry in a codebook of precoding matrices. Directly signaling a precoding for another device to use may be referred to as digital signaling. For example, a BS may signal the index of a codebook based precoder for UL MIMO transmissions in a DL control channel transmitted to a UE.

According to aspects of the present disclosure, a UE may determine, based on an unprecoded reference signal from a BS, an UL precoding matrix for the UE to use in transmitting to the BS. Determining an UL precoding matrix to use based on an unprecoded DL signal may be referred to as using an open-loop technique. In an open-loop technique, a UE determines an UL precoding matrix without information from a BS on precoding used by the BS.

According to aspects of the present disclosure, a UE may determine an UL precoding based on an unprecoded DL RS, such as a cell-specific reference signal (CRS).

Figure 12:
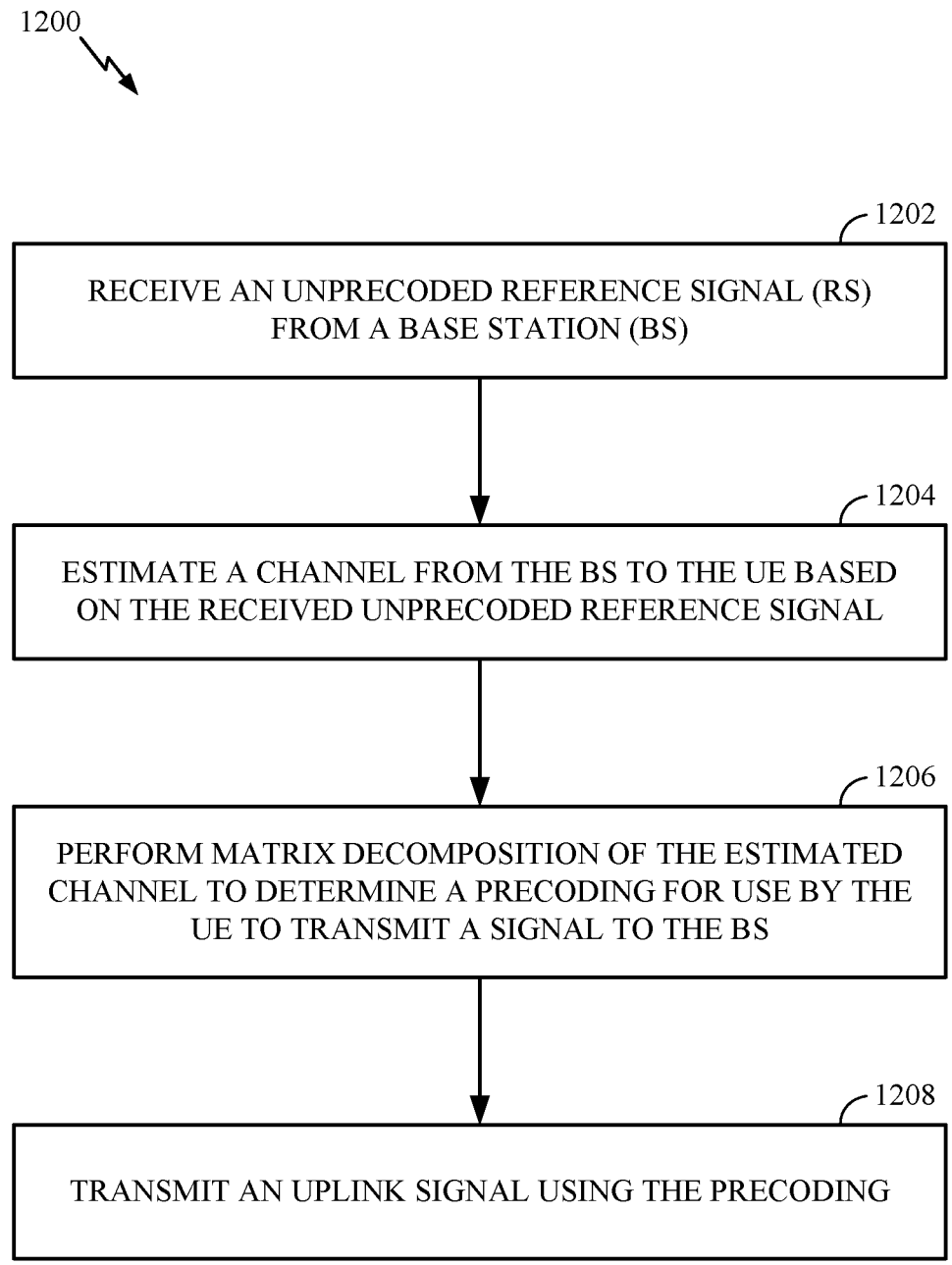
FIG. 12 illustrates example operations for wireless communications using an open loop technique to determine a precoding for a UE, in accordance with aspects of the present disclosure.

FIG. 12 illustrates example operations 1200 for using an open loop technique to determine a precoding for a user equipment (UE), according to aspects of the present disclosure. The operations 1200 may be performed, for example, by UE 120, shown in FIG. 1, or UE 750, shown in FIG. 7.

Operations 1200 may begin at 1202 by the UE receiving an unprecoded reference signal (RS) from a base station (BS). For example, UE 750 may receive an unprecoded CRS, which may be transmitted by a BS (e.g., TRP 722*c*) at regular intervals.

At block 1204, operations 1200 continue with the UE estimating a channel from the BS to the UE based on the received unprecoded reference signal. Continuing the example from above, the UE estimates the channel from the TRP to the UE, based on the unprecoded CRS received in block 1202.

Operations 1200 continue at block 1206 with the UE performing matrix decomposition of the estimated channel to determine a precoding block for use by the UE to transmit a signal to the BS. Continuing the example from above, the UE performs matrix decomposition to determine a precoding for use by the UE to transmit a signal to the BS.

At block 1208, operations 1200 continue with the UE transmitting an uplink signal using the precoding. Continuing the example from above, the UE transmits a PUSCH to the TRP using the precoding determined in block 1206.

Figure 13:
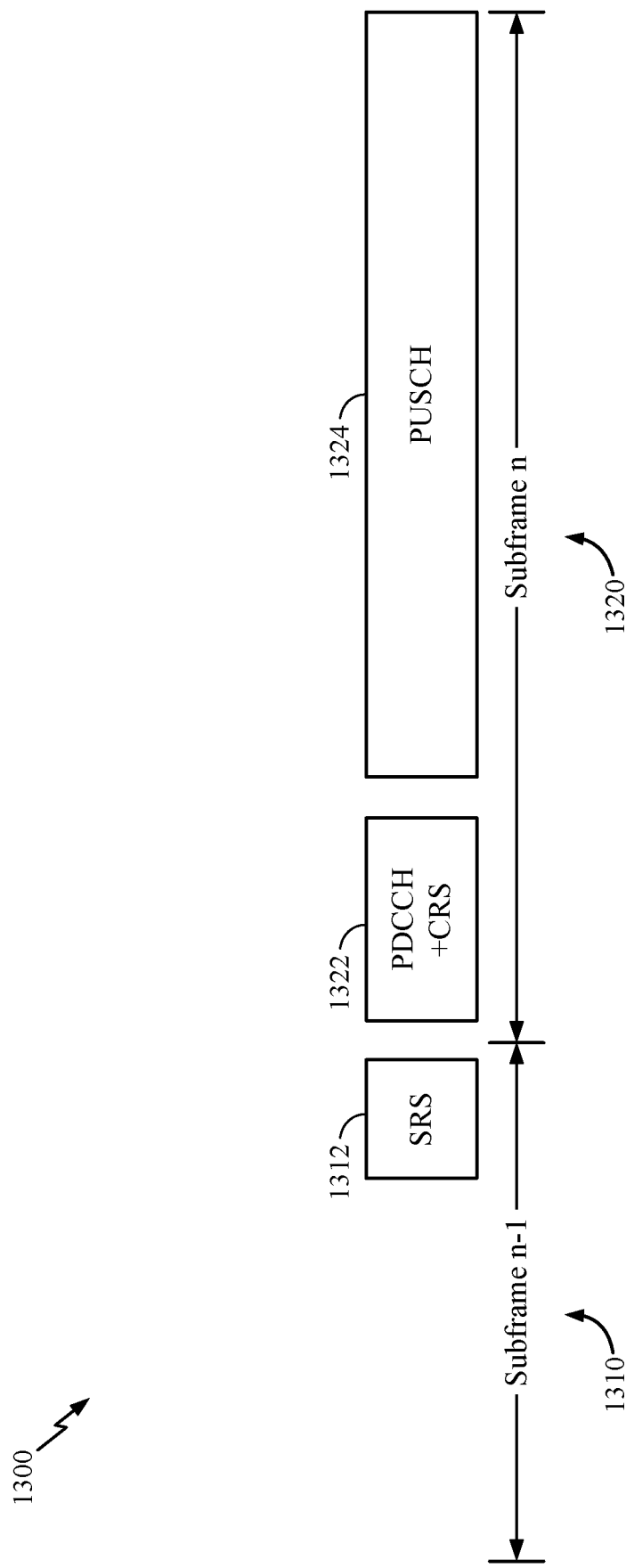
FIG. 13 illustrates an exemplary transmission timeline, according to aspects of the present disclosure.

FIG. 13 illustrates an exemplary transmission timeline 1300 of a communication system in which aspects of the present disclosure may be practiced. In the exemplary timeline, a BS (e.g., BS 110 shown in FIG. 1) and a UE (e.g., UE 120 shown in FIG. 1) are communicating while the UE uses an open loop technique (as described above) to determine a precoding for the UE to use while transmitting to the BS. At 1312, the UE transmits a sounding reference signal (SRS) in a subframe n−1 1310. The BS receives the SRS from the UE and estimates the channel, $H_{M \times N}$, between the UE and the BS. The BS uses the channel estimate in determining parameters for transmitting a PDCCH to the UE. At 1322, the BS may transmit a PDCCH and cell-specific reference signals (CRS) in a subframe n 1320. The PDCCH may include an uplink grant indicating that the UE is to transmit data to the BS.

The UE receives the PDCCH and CRS from the BS and estimates the channel, $H^H_{N \times M}$, based on the CRS. The UE then applies channel reciprocity and assumes the effective channel for an uplink transmission is equal to the effective channel for the downlink transmission. For an uplink transmission, the effective channel is equal to an uplink precoding matrix, $V_{N \times N}$, multiplied by transmitted signal, i.e., $$H'_{N \times M} = V_{N \times N} \Sigma_{N \times M} U^H_{M \times M}$$

The UE then performs matrix decomposition, such as singular value decomposition (SVD), to calculate the UL precoding matrix. At 1324, the UE transmits an uplink signal (e.g., a PUSCH) using the calculated UL precoding matrix.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, modulators 432, demodulators 432, a receive processor 438, or antenna(s) 434 of the base station 110 and/or one or more of the transmit processor 464, a TX MIMO processor 466, a receive processor 458, modulators 454, demodulators 454, or antenna(s) 452 of the user equipment 120. Additionally, means for determining, means for generating, means for multiplexing, means for estimating, means for performing singular value decomposition, means for performing a matrix decomposition, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a precoded reference signal (RS) from a base station (BS);
   determining, by the UE, a first precoding used by the BS to transmit the RS;

calculating an effective channel based on the first precoding;

determining, by the UE, a second precoding based on the effective channel; and transmitting a signal to the BS using the second precoding.

2. The method of claim 1, wherein the RS comprises a channel state information reference signal (CSI-RS).

3. The method of claim 1, wherein calculating the effective channel comprises:

estimating a channel based on the RS; and multiplying the estimated channel by the first precoding to calculate the effective channel.

4. The method of claim 1, further comprising:

transmitting a sounding reference signal (SRS) for use by the BS in selecting the first precoding.

5. The method of claim 1, wherein determining the second precoding comprises performing a matrix decomposition on the effective channel to calculate the second precoding.

6. The method of claim 5, wherein the matrix decomposition comprises singular value decomposition.

7. The method of claim 1, wherein:

the UE receives the RS in a first subframe; and the UE transmits the signal in a second subframe after the first subframe.

8. A method for wireless communications by a base station (BS), comprising:

receiving a sounding reference signal (SRS) from a user equipment (UE);

estimating a channel based on the SRS;

estimating a noise covariance matrix based on the estimated channel;

calculating, based on the noise covariance matrix, a first precoding to convey using a reference signal (RS), to the UE, wherein from the first precoding, the UE determines a second precoding as a function of the first precoding for use by the UE to transmit an uplink (UL) signal to the BS; and transmitting the reference signal (RS) to the UE using the first precoding.

9. The method of claim 8, wherein the RS comprises a channel state information reference signal (CSI-RS).

10. The method of claim 8, further comprising:

receiving a signal transmitted by the UE using the second precoding.

11. An apparatus for wireless communications, comprising:

means for receiving a precoded reference signal (RS) from a base station (BS);

means for determining, by the apparatus, a first precoding used by the BS to transmit the RS;

means for calculating an effective channel based on the first precoding;

means for determining, by the apparatus, a second precoding based on the effective channel; and means for transmitting a signal to the BS using the second precoding.

12. The apparatus of claim 11, wherein the RS comprises a channel state information reference signal (CSI-RS).

13. The apparatus of claim 11, wherein the means for calculating the effective channel comprises:

means for estimating a channel based on the RS; and means for multiplying the estimated channel by the first precoding to calculate the effective channel.

14. The apparatus of claim 11, further comprising:

means for transmitting a sounding reference signal (SRS) for use by the BS in selecting the first precoding.

15. The apparatus of claim 11, wherein the means for determining the second precoding comprises means for performing a matrix decomposition on the effective channel to calculate the second precoding.

16. The apparatus of claim 15, wherein the matrix decomposition comprises singular value decomposition.

17. The apparatus of claim 11, wherein:

the means for receiving is configured to receive the RS in a first subframe; and the means for transmitting is configured to transmit the UL signal in a second subframe after the first subframe.

18. A method for wireless communications by a user equipment (UE), comprising:

receiving a precoded reference signal (RS) from a base station (BS);

estimating a channel based on the RS;

determining a first precoding used by the BS to transmit the RS;

calculating an effective channel based on the estimated channel and the first precoding;

performing matrix decomposition based on the effective channel;

determining a second precoding based on the matrix decomposition; and transmitting a signal to the BS using the second precoding.

19. The method of claim 18, wherein determining the first precoding comprises:

measuring content of the received RS;

comparing the measured content to a known content; and determining the first precoding based on the comparison.

* * * * *